(12) United States Patent
McCormick et al.

(10) Patent No.: US 12,070,046 B2
(45) Date of Patent: Aug. 27, 2024

(54) SILK HOLDER APPARATUS AND METHOD OF USING SILK HOLDER APPARATUS WITH STENCIL HOLDER

(71) Applicants: Ginny McCormick, Galveston, TX (US); Doug Levack, Galveston, TX (US); Dan Naramor, Garland, TX (US)

(72) Inventors: Ginny McCormick, Galveston, TX (US); Doug Levack, Galveston, TX (US); Dan Naramor, Garland, TX (US)

( * ) Notice: Subject to any disclaimer, the term of this patent is extended or adjusted under 35 U.S.C. 154(b) by 0 days.

(21) Appl. No.: 17/742,493

(22) Filed: May 12, 2022

(65) Prior Publication Data
US 2022/0369661 A1 Nov. 24, 2022

Related U.S. Application Data

(60) Provisional application No. 63/192,057, filed on May 23, 2021.

(51) Int. Cl.
*A23G 3/28* (2006.01)
*A23L 5/40* (2016.01)

(52) U.S. Cl.
CPC . *A23G 3/28* (2013.01); *A23L 5/40* (2016.08)

(58) Field of Classification Search
CPC .. A23G 3/28; A23L 5/40; A21D 13/00; A21D 13/20; B41F 15/34; B41F 15/36; B41F 15/405; B05C 17/06; B05C 17/08
USPC ............................................. 118/504, 13, 14
See application file for complete search history.

(56) References Cited

U.S. PATENT DOCUMENTS

| | | | | |
|---|---|---|---|---|
| 1,627,630 | A * | 5/1927 | Carter | A21C 15/002 |
| | | | | 101/114 |
| 2,125,457 | A * | 8/1938 | Merritt | B44F 3/00 |
| | | | | 118/504 |
| 5,355,792 | A * | 10/1994 | MacNaughton | B41F 15/36 |
| | | | | 38/102.2 |
| 5,669,299 | A * | 9/1997 | Ando | B41L 13/00 |
| | | | | 101/125 |
| 8,627,768 | B2 * | 1/2014 | Smith | B43L 13/208 |
| | | | | 33/18.1 |

(Continued)

FOREIGN PATENT DOCUMENTS

DE 1078144 * 3/1960

OTHER PUBLICATIONS

English translation of Description of DE1078144 published Mar. 1960 (Year: 1960).*

(Continued)

*Primary Examiner* — Jethro M. Pence

(57) ABSTRACT

An apparatus for use in decorating cookies, baked items or other items, comprising a thermoplastic rubber base piece; a piece of polyester silk component positioned on the thermoplastic rubber base piece; and an ABS plastic top piece, wherein the apparatus is configured to eliminate lifting of the stencil while airbrushing. When airbrushing food coloring through a stencil on to cookies or other items, the polyester silk screen presses the stencil against the item firmly and evenly across its entire surface. Further, the polyester silk screen slows the movement of air therethrough. These two properties both act to reduce an undesirable effect of the airbrushing process called under-spray, in which the airstream lifts the stencil off the cookie or other item slightly, blurring the edges of the stenciled image.

2 Claims, 10 Drawing Sheets

(56) References Cited

U.S. PATENT DOCUMENTS

| | | |
|---|---|---|
| 10,383,350 B2 | 8/2019 | McCormick et al. |
| D858,630 S * | 9/2019 | McCormick ............ B41F 15/34 |
| | | D19/40 |
| 2004/0123799 A1* | 7/2004 | Clark .................. H10K 71/166 |
| | | 118/504 |
| 2005/0051042 A1* | 3/2005 | Salisbury ................ B41F 15/36 |
| | | 101/127.1 |
| 2011/0049087 A1* | 3/2011 | Ferguson .............. B25B 11/002 |
| | | 29/559 |
| 2017/0042195 A1* | 2/2017 | McCormick ........... A21D 13/20 |

OTHER PUBLICATIONS

English translation DE20023380, Cadilac Laser GMBH, published Feb. 2004 (Year: 2004).*

* cited by examiner

SILK HOLDER APPARATUS AND METHOD OF USING SILK HOLDER APPARATUS WITH STENCIL HOLDER

CROSS REFERENCE TO RELATED APPLICATION

The present application claims priority through U.S. Provisional Patent Application 63/192,057 filed 23 May 2021, which is incorporated herein by reference.

TECHNICAL FIELD

The invention relates to stencil apparatus used to decorate food products and baked goods such as cookies, cupcakes, cakes and the like, and methods of using such apparatus.

BACKGROUND OF THE INVENTION

Bakers, hobbyists and cookiers (one who bakes cookies) often desire to decorate their food products and baked goods such as cookies, cupcakes, cakes and other items. Often, this is done using stencils. Two of the co-inventors have patented a stencil holder apparatus and method to secure stencils while airbrushing. However, when using an apparatus that air sprays aerosolized frosting on a baked good, there is often overspray that results in less than sharp edges in the figures and letters that are sprayed on the baked goods. What is desired is a further apparatus that complements a stencil holder apparatus and which is dimensioned to hold a polyester silk screen.

A thermoplastic is a material, usually a plastic polymer, which becomes soft when heated and hard when cooled. Thermoplastic materials can be cooled and heated several times without any change in their chemical or mechanical properties. Thermoplastic elastomers are a class of polymers that have both thermoplastic and elastomeric properties, meaning they're heat-resistant and durable, but still flexible. Other materials that can be used include thermoplastic elastomer (TPE) and thermoplastic polyurethane (TPU) which are both thermoplastic elastomers.

ABS refers to Acrylonitrile Butadiene Styrene (ABS) which is an opaque thermoplastic and amorphous polymer. ABS is light weight and can be injection molded and extruded thus make it useful in manufacturing products such as parts of the invention.

SUMMARY OF THE INVENTION

The invention, as seen in the Figures has three (3) components: a thermoplastic rubber base (aka gasket or retainer), a sheet or screen of material being or having the characteristics of polyester silk (referred to herein as polyester silk screen) and an ABS plastic top piece (aka frame). The invention, in combination with a stencil holder frame, holds a stencil firmly and evenly against a baked good, such as a cookie or other item to be decorated and, further, firmly holds a polyester silk screen in front of the stencil and is operative to slows the speed of an airstream of aerosolized food coloring used in airbrushing, both properties acting to reduce movement of said stencil relative to the item being decorated, resulting in the images on the decorated items having sharper and better-defined edges.

To those skilled in the art to which this invention relates, many changes in construction and widely differing embodiments and applications of the invention will suggest themselves without departing from the scope of the invention as defined herein. The disclosures and the descriptions herein are purely illustrative and are not intended to be in any sense limiting.

BRIEF DESCRIPTION OF THE DRAWINGS

For a better understanding of the present invention including the features, advantages and embodiments, reference is made to the following detailed description along with accompanying Figures, in which.

DETAILED DESCRIPTION

While the making and using of the disclosed embodiments of the present invention is discussed in detail below, it should be appreciated that the present invention provides many applicable inventive concepts which can be embodied in a wide variety of contexts. Some features of the preferred embodiments shown and discussed may be simplified or exaggerated for illustrating the principles of the invention.

Figure 1:
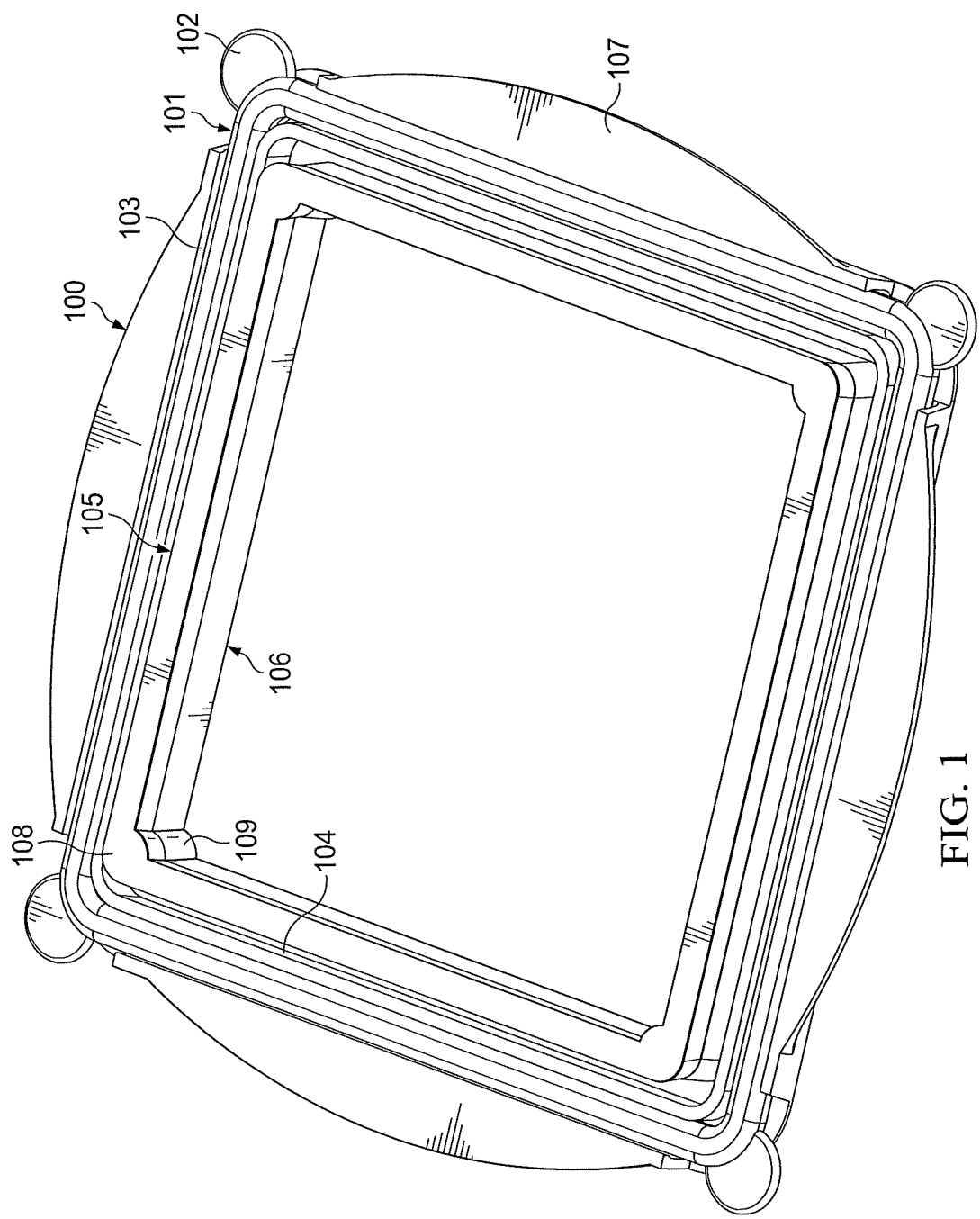
FIG. 1 is a perspective view showing the underneath of the assembled invention in use with a stencil holder frame, lacking the polyester silk screen for element visibility, in an embodiment of the present invention.

Referring to FIG. 1, seen is a perspective view showing the underneath of the assembled invention in use with a stencil holder frame, lacking the polyester silk screen 200 for element visibility, in an embodiment of the present invention. As seen therein, the invention is an apparatus for decorating baked goods, such as cookies, baked items or other items, comprising at least 3 components, a thermoplastic rubber base 101, a polyester silk screen 200 (as seen in FIG. 200) which is positioned on the thermoplastic rubber base 101; and an ABS plastic top piece 100 placed over the thermoplastic rubber base 101 and polyester silk screen 200 such that said polyester silk screen 200 is interspersed between said thermoplastic rubber base 101 and said ABS plastic top piece 100 and held firmly in position thereby. Also seen in FIG. 1 include tabs 102 extending outward from the corners of said thermoplastic rubber base 101, top piece groove 103, aperture 104 defining the interior edges of the ABS plastic top piece 100, lower stencil holder element 105 of a stencil holder frame, an upper stencil holder element 106 of as stencil holder frame, arched extension 107 which serves to provide stiffness to each of said ABS plastic top piece 100 frame legs, and magnets 108, 109 in each corner of the upper and lower stencil holder elements 105, 106, respectively.

Figure 2:
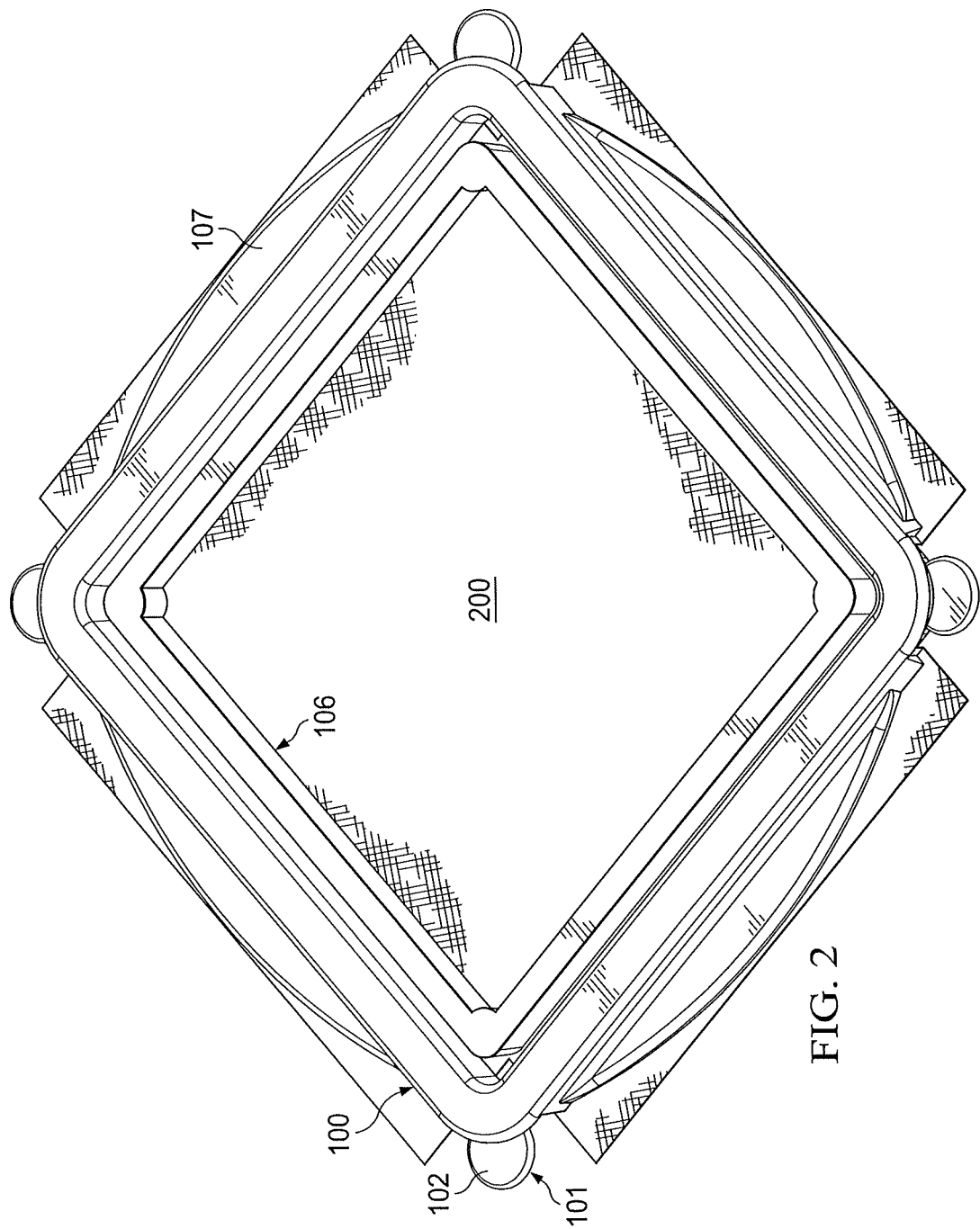
FIG. 2 is a perspective view showing the top side of the assembled invention including the polyester silk screen in use with a stencil holder frame in the preferred embodiment of the present invention.

FIG. 2 is a perspective view showing the top side of the assembled invention including the polyester silk screen 200 in use with a stencil holder frame 105, 106 in the preferred embodiment of the present invention. As seen therein, the invention is an apparatus for decorating baked goods, such as cookies, baked items or other items, comprising a thermoplastic rubber base 101, a polyester silk screen 200 to be positioned on the thermoplastic rubber base; and an ABS plastic top piece 100 to be placed over the thermoplastic rubber base and polyester silk screen such that said polyester silk screen is interspersed between said thermoplastic rubber base and said ABS plastic top piece and held firmly in position thereby. Also seen in FIG. 2 are tabs 102 extending outward from the corners of said thermoplastic rubber base 101, and an upper stencil holder element 106 of as stencil holder frame and arched extension 107 which serves to provide stiffness to each of said ABS plastic top piece 100 frame legs.

The thermoplastic rubber base 101 is a partially rigid, square and semi flexible frame, comprising four legs, each of said legs having a circular cross-section. While the rubber base is described as thermoplastic, any material with similar characteristics can be used as the rubber base. The thermoplastic rubber base 101 further comprises, in a preferred embodiment, tabs 102 extending outward from the corners of said rubber base. The tabs can be any shape, preferably circular, and are used to hold down the rubber base for easier separation and removal of the ABS top piece from said rubber base.

Figure 3:
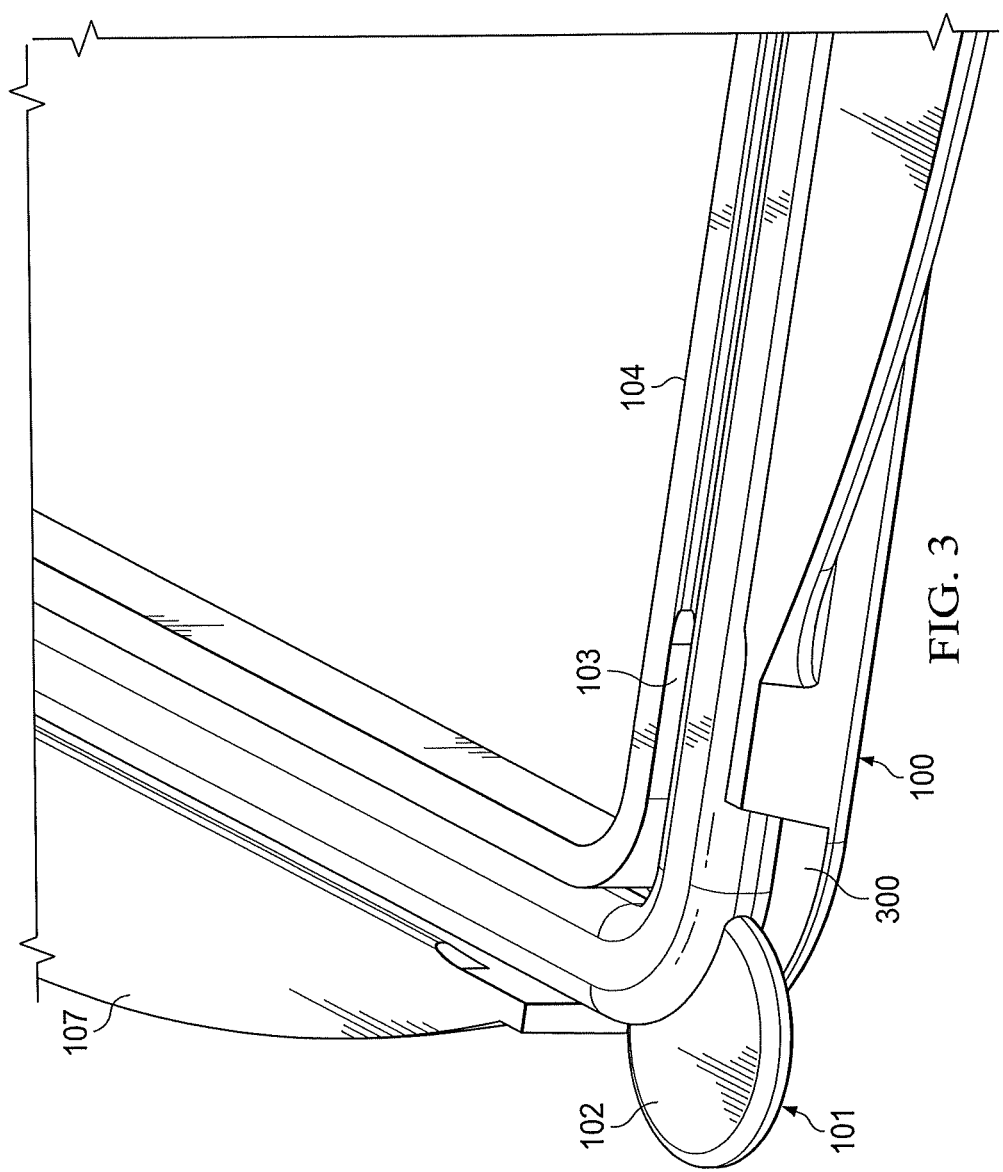
FIG. 3 is an underneath perspective close-in view showing one corner of the assembled invention, lacking the polyester silk screen for visibility, in an embodiment of the present invention.
Figure 4:
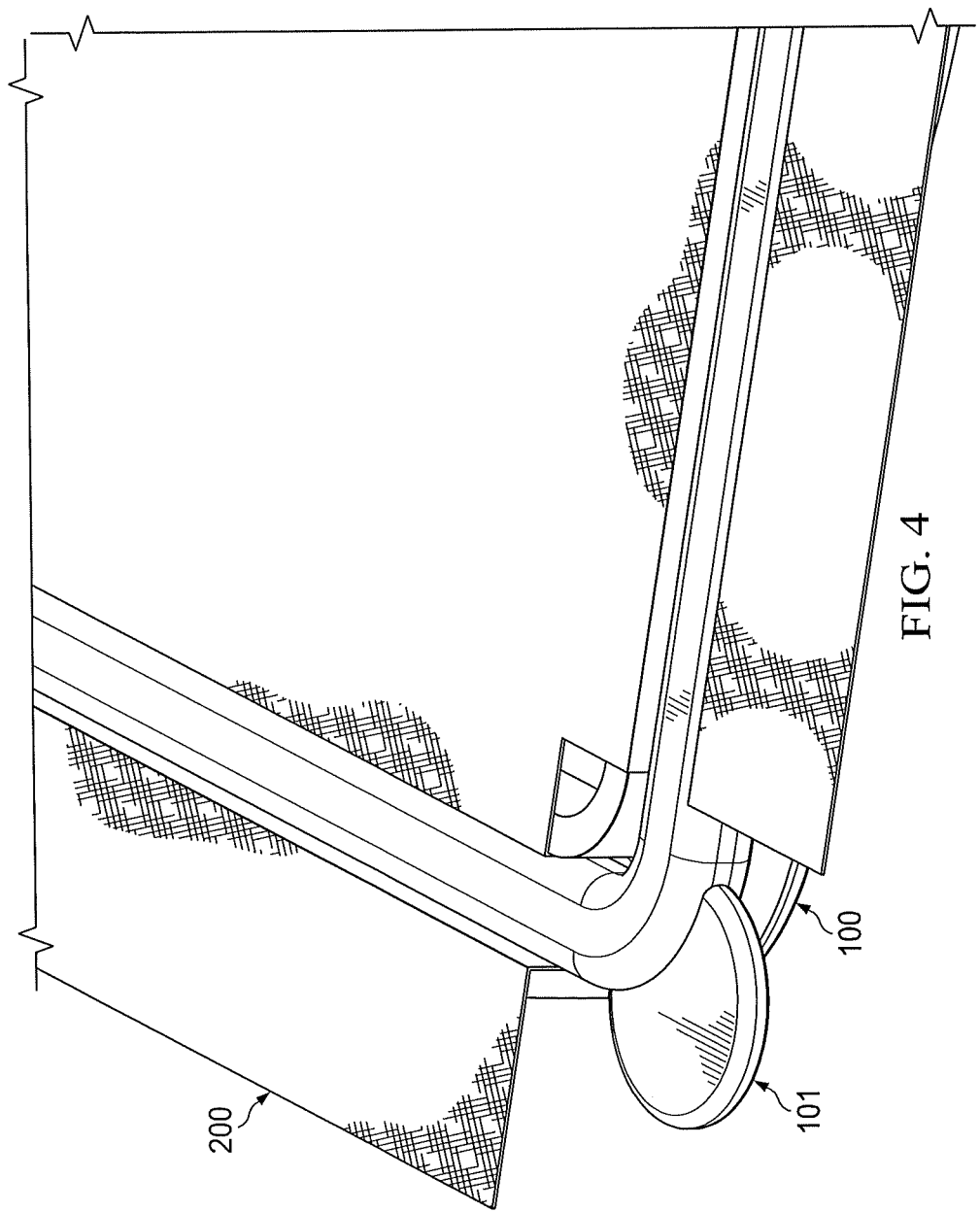
FIG. 4 is an underneath perspective close-in view showing one corner of the assembled invention, including a cutaway of the polyester silk screen, in an embodiment of the present invention.

Referring to FIG. 3, an underneath perspective close-in view showing one corner of the assembled invention, lacking the polyester silk screen 200 for visibility, in an embodiment of the present invention. FIG. 4 is an underneath perspective close-in view showing one corner of the assembled invention, including a cutaway of the polyester silk screen 200, in an embodiment of the present invention.

Referring back to FIG. 3, the ABS top piece 100 is a generally square frame having a groove 103 inset within its perimeter edges and dimensioned to fit snugly over the thermoplastic rubber base 101 and interspersed polyester silk screen 200, with an aperture 104 defining the interior edges of the ABS top piece 100. The aperture 104 of the ABS top piece 100 is dimensioned to receive a stencil holder frame 105, 106, such as the stencil holder frame 105, 106 shown in FIGS. 1, 2, 9, and 10 comprising an upper stencil holder element 106 and lower stencil holder element 105, the stencil holder frame elements 105, 106 being removably attached to each other via magnets 108, 109 in each corner of the upper and lower stencil holder elements 105, 106, respectively. The ABS plastic top piece 100 further comprises on each frame leg of the ABS plastic top piece 100 an arched extension 107 which serves to provide stiffness to each of said frame legs of the ABS plastic top piece 100. The ABS plastic top piece 100 further comprises in each of its four corners a removed section 300 of the outer wall of the inset groove 103 in order to admit the hold-down tabs 102 of the thermoplastic rubber base 101 as illustrated in FIG. 3, and further in order to reduce wrinkling in the polyester silk screen 200.

Figure 5:
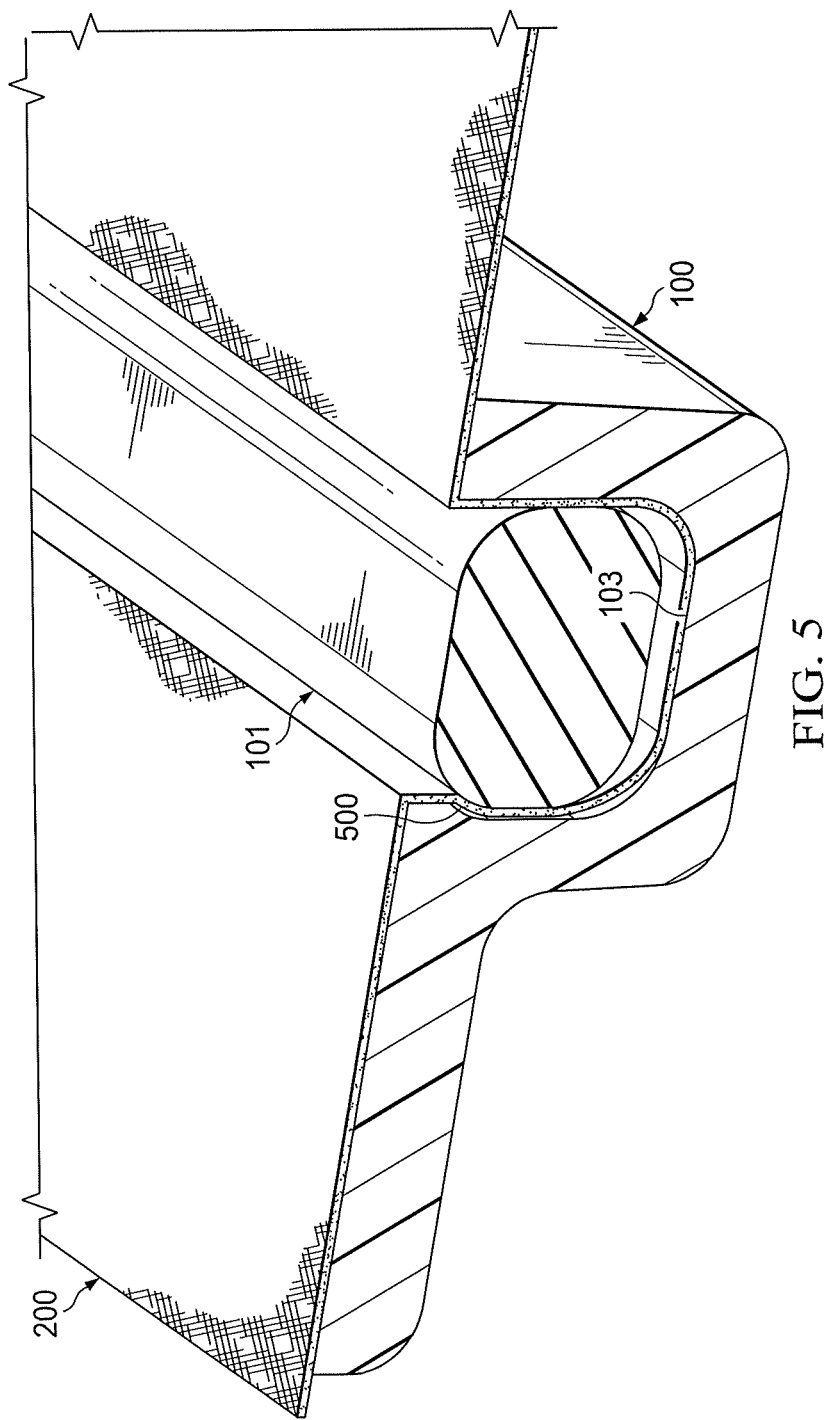
FIG. 5 is an underneath perspective close-in cutaway view showing the cross-sectional geometry of one leg of the thermoplastic rubber base sitting in the groove of the ABS plastic top piece with the polyester silk screen layer interspersed between the two, in the preferred embodiment of the present invention.

FIG. 5 is an underneath perspective close-in cutaway view showing the cross-sectional geometry of one leg of the thermoplastic rubber base 101 sitting in the groove of the ABS plastic top piece 100 with the polyester silk screen 200 layer interspersed between the two, in the preferred embodiment of the present invention. As seen in the closeup cross-sectional of FIG. 5, the ABS plastic top piece 100 further comprises a slight groove overhang 500 which maintains and secures the thermoplastic rubber base 101 frame leg in the ABS plastic top piece groove 103. The pliable thermoplastic rubber base is temporarily deformed by said groove overhang 500 during the act of firmly pressing down the ABS top piece 100 onto the thermoplastic rubber base 101 and recovers its shape once it is received in the groove 103. The same temporary deformation occurs when removing said ABS plastic top piece 100 from said thermoplastic rubber base 101. The interspersion of said polyester silk screen 200 between said rubber base 101 and said top piece 100 does not change this functionality. Although ABS is used herein to describe this component of the invention, this component of the invention can be made from material with characteristics similar to ABS.

Figure 6:
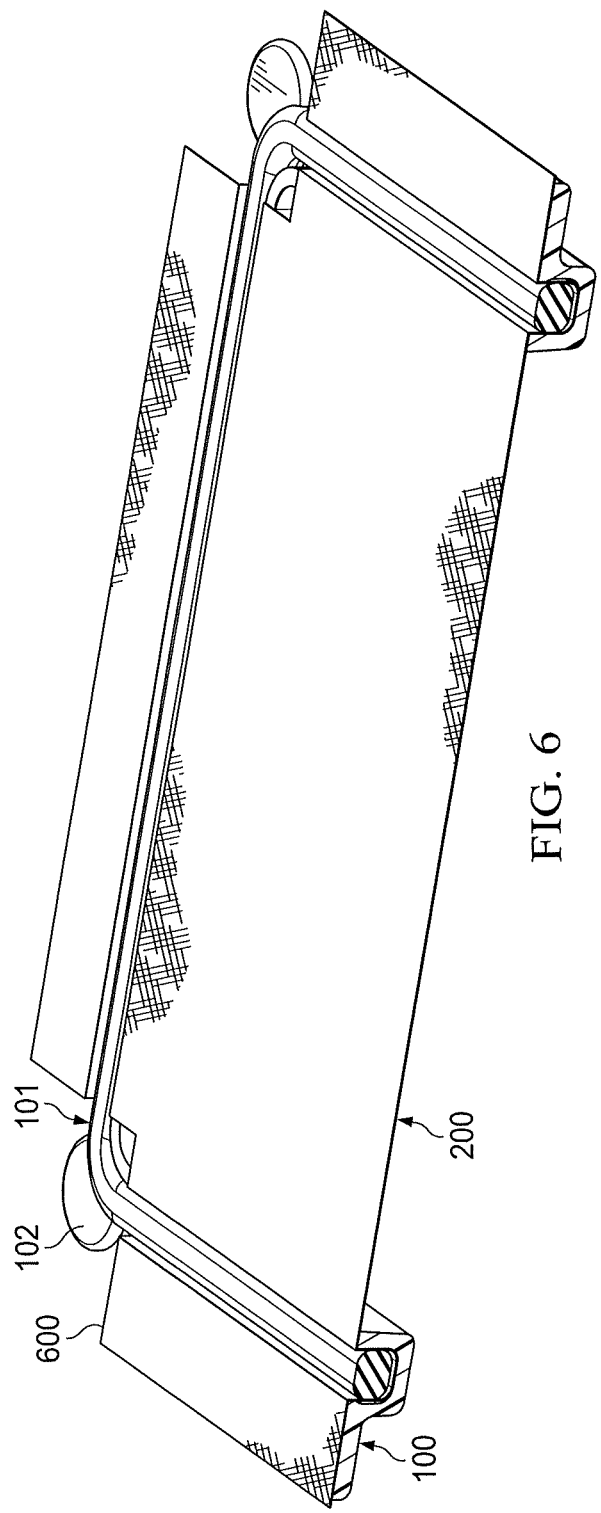
FIG. 6 is an underneath perspective cutaway view showing about a one-third of the assembled invention without a stencil holder frame, in the preferred embodiment.

FIG. 6 is an underneath perspective cutaway view of the invention having showing about a one-third of the assembled invention without a stencil holder frame 105, 106, in the preferred embodiment, comprising the at least 3 components, a thermoplastic rubber base 101, a polyester silk screen 200 which is positioned on the thermoplastic rubber base 101 and an ABS plastic top piece 100 placed over the thermoplastic rubber base. Also seen in FIG. 6 is tab 102 extending outward from each of the corners of said thermoplastic rubber base 101. The polyester silk screen 200 can be any shape, preferably square and comprising corner cutouts 600 of a preferably square shape and equivalent size in each corner of said polyester silk screen 200, and dimensioned so that the edges of the polyester silk screen 200, when said screen is placed over the thermoplastic rubber base 101, extend beyond all four frame legs of the thermoplastic rubber base 101. The corner cutouts 600 serve to reduce wrinkling in the polyester silk screen 200 when the ABS plastic top piece 100 is placed over and receives the thermoplastic rubber base 101 in the top piece groove 103.

Figure 7:
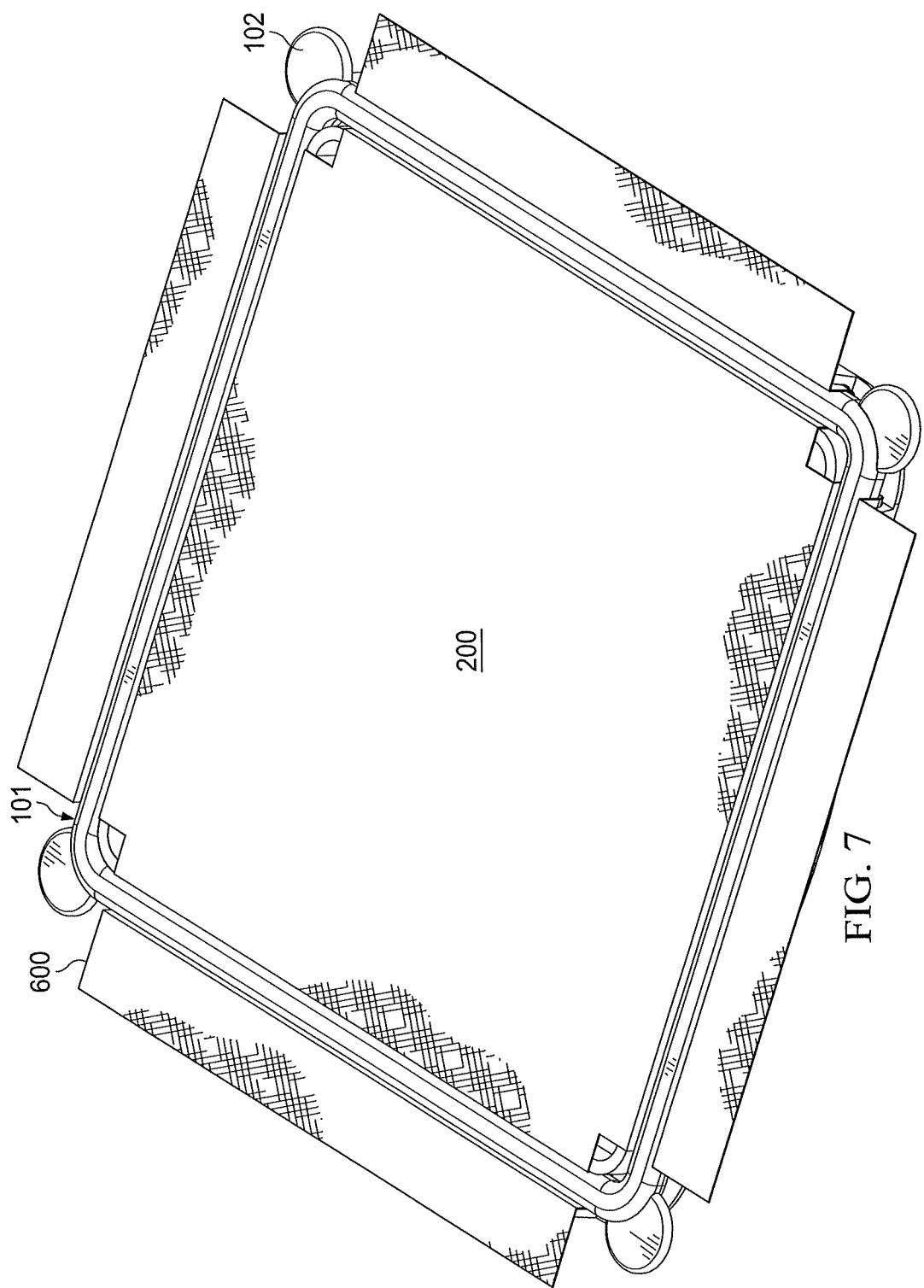
FIG. 7 is an underneath perspective view of the assembled invention as a whole, in the preferred embodiment.

FIG. 7 is an underneath perspective view of the assembled invention as a whole, in the preferred embodiment. As seen therein, is a polyester silk screen 200 which is positioned on the thermoplastic rubber base 101 and corner cutouts 600 of a preferably square shape and equivalent size in each corner of said polyester silk screen 200, and dimensioned so that the edges of the polyester silk screen 200, when said screen is placed over the thermoplastic rubber base 101, extend beyond all four frame legs of the thermoplastic rubber base 101.

Figure 8:
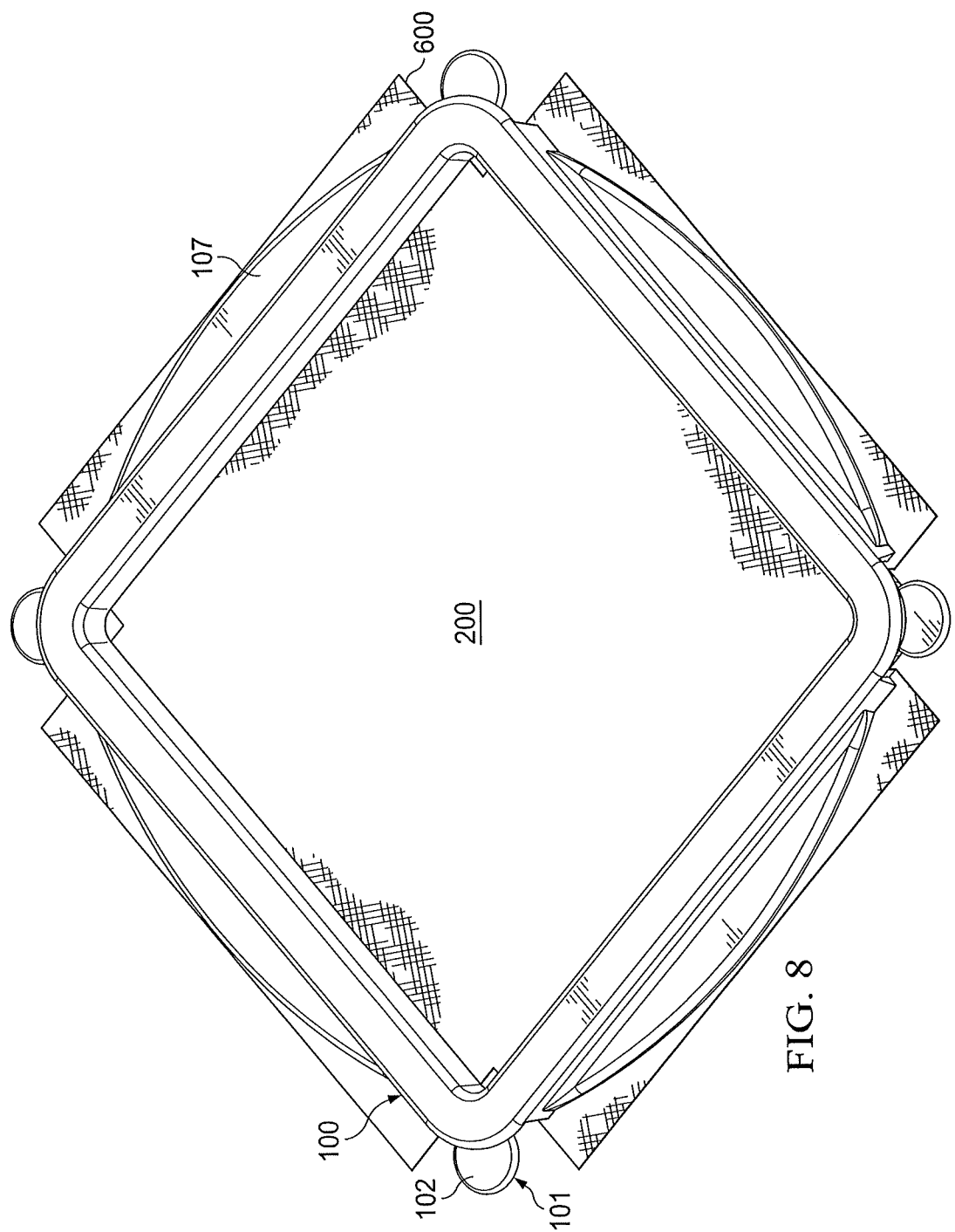
FIG. 8 is a top perspective view of the assembled invention as a whole, without a stencil holder frame, in the preferred embodiment.

FIG. 8 is a top perspective view of the assembled invention as a whole, without a stencil holder frame 105, 106, in the preferred embodiment, showing the thermoplastic rubber base 101, a polyester silk screen 200 which is positioned on the thermoplastic rubber base 101 and an ABS plastic top piece 100 placed over the thermoplastic rubber base. Polyester silk screen 200 is shown positioned on the thermoplastic rubber base 101 and corner cutouts 600 of a preferably square shape and equivalent size in each corner of said polyester silk screen 200, and dimensioned so that the edges of the polyester silk screen 200, when said screen is placed over the thermoplastic rubber base 101, extend beyond all four frame legs of the thermoplastic rubber base 101.

Figure 9:
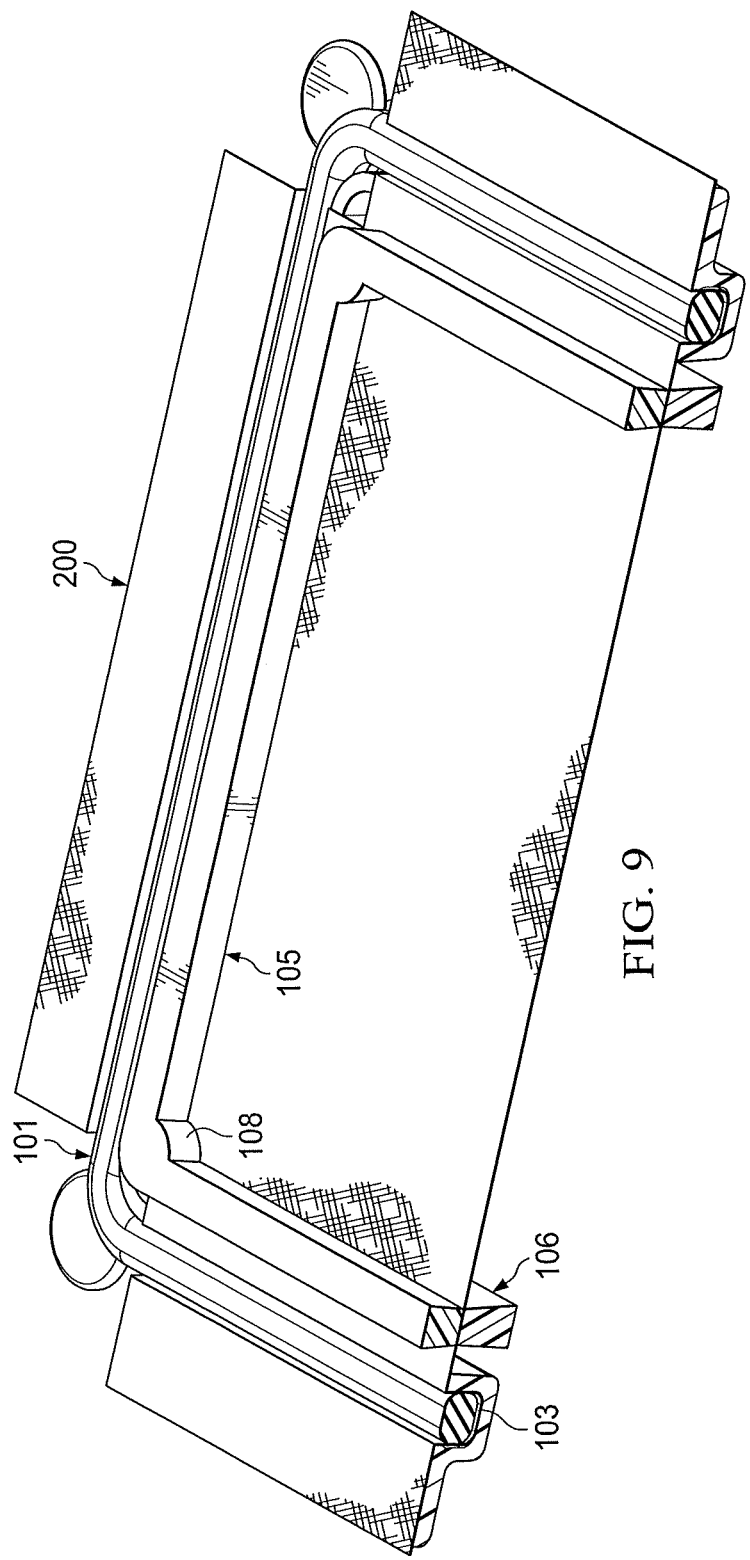
FIG. 9 is an underneath perspective cutaway view showing about one-third of the assembled invention in use with a stencil holder frame holder, in an embodiment of the present invention.

FIG. 9 is an underneath perspective cutaway view showing about one-third of the assembled invention in use with a stencil holder frame holder 105, 106, in an embodiment of the present invention. Also seen therein are the thermoplastic rubber base 101, a polyester silk screen 200 which is positioned on the thermoplastic rubber base 101 and an ABS plastic top piece 100 placed over the thermoplastic rubber base 101 using the top piece groove 103.

Figure 10:
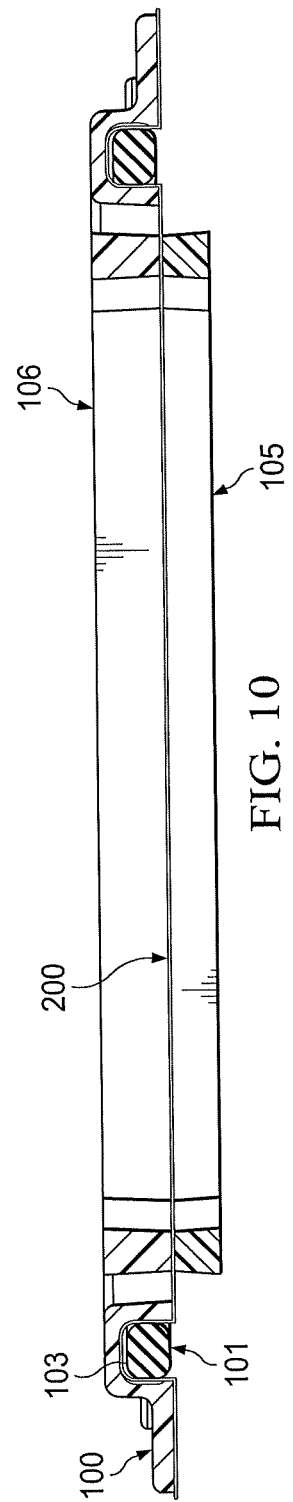
FIG. 10 is a side planform cutaway view of the assembled invention in use with a stencil holder frame holder, in an embodiment of the present invention.

FIG. 10 is a side planform cutaway view of the assembled invention in use with a stencil holder frame holder 105, 106, in an embodiment of the present invention. Also seen therein are the thermoplastic rubber base 101, a polyester silk screen 200 which is positioned on the thermoplastic rubber base 101 and an ABS plastic top piece 100 placed over the thermoplastic rubber base using the top piece groove 103.

With reference to the Figures, the method of using the invention is as follows:

Step one: position the thermoplastic rubber base 101 on a flat surface;

Step two: position the polyester silk screen 200 on top of the thermoplastic rubber base 101; and Step three: position the ABS plastic top piece 100 over the polyester silk screen 200 and press down to tightly secure the polyester silk screen 200 between the edges of the thermoplastic rubber base 101 and the ABS plastic top piece 100.

The method of using the invention with a stencil holder frame 105. 106 is as follows:

Step one: position the lower stencil holder frame element 105 on a flat surface;

Step two: position a stencil on the stencil holder frame 105;

Step three: position the assembled invention on top of the lower stencil holder frame element 105;

Step four: secure magnetically with the upper stencil holder frame element 106,

Step five: utilize the assembled invention, assembled stencil holder frame 105, 106, and stencil in the desired stencil work.

When airbrushing food coloring through a stencil on to cookies or other items, the polyester silk screen 200 presses the stencil against the baked item firmly and evenly across its entire surface. Further, the polyester silk screen 200 slows the movement of air therethrough. These two properties both act to reduce an undesirable effect of the airbrushing process called under-spray, in which the airstream lifts the stencil off the cookie or other item slightly, blurring the edges of the stenciled image.

The invention is an apparatus for use in decorating cookies, baked items or other items, comprising a thermoplastic rubber base piece 101; a piece of polyester silk 200 positioned on the thermoplastic rubber base piece 101; and an ABS plastic top piece 100, wherein the apparatus is operable to eliminate undesirable movement of a stencil relative to an item being decorated while airbrushing.

The invention further is the above apparatus in combination with a stencil holder frame 105, 106.

While the present invention has been described by reference to certain embodiments, it is pointed out that the embodiments described are illustrative rather than limiting in nature and that many variations and modifications are possible within the scope of the invention. For example, the components can be also be designed in other sizes to accommodate other styles and sizes of stencils. Many such variations and modifications may be considered obvious and desirable by those skilled in the art based upon a review of the foregoing description.

The embodiments shown and described above are only exemplary. Even though numerous characteristics and advantages of the present invention have been set forth in the foregoing description together with details of the elements and methods of the present invention, the disclosure is illustrative only and changes may be made within the principles of the invention to the full extent indicated by the broad general meaning of the terms used herein. Various alterations, modifications and substitutions can be made to the elements of the disclosed invention without departing in any way from the spirit and scope of the invention.

What we claim is:

1. An apparatus for use with a stencil holder frame for decorating cookies, baked items or other items, comprising:
   a thermoplastic rubber base piece;
   a screen of polyester silk component configured to be positioned on the thermoplastic rubber base piece; and
   an Acrylonitrile Butadiene Styrene (ABS) plastic top piece, wherein the apparatus is operable to secure the stencil holder frame relative to an item being decorated while airbrushing;
   further wherein said thermoplastic rubber base piece is dimensioned as a square frame having four side elements, is further made of a partially rigid, semi-flexible material, and further comprises hold-down tabs extending outward from each corner operable to facilitate disassembly of the invention;
   said screen of polyester silk is dimensioned as a square having edges extend in both lateral directions past the four side elements of the thermoplastic rubber base piece and the ABS plastic top piece, and further comprises in each corner cutouts of a square shape and equivalent size operable to reduce wrinkling of said screen of polyester silk when the invention is assembled; and
   said ABS plastic top piece is dimensioned as a generally square frame having four side elements, and further comprising a groove within perimeter edges dimensioned to fit snugly over the thermoplastic rubber base piece and the screen of polyester silk, and further comprising on each ABS plastic top piece side element an arched extension operable to provide rigidity to each of said four side elements, and further comprising in each of four corners a removed section of the outer wall of the groove operable to reduce wrinkling of said polyester silk screen when the apparatus is assembled and to admit said hold-down tabs of said thermoplastic rubber base piece, and further comprising a groove overhang operable to maintain and secure the thermoplastic rubber base piece in the ABS plastic top piece groove.

2. The apparatus of claim 1, in combination with the stencil holder frame.

* * * * *